United States Patent [19]

Sidwell

[11] Patent Number: 5,884,069
[45] Date of Patent: Mar. 16, 1999

[54] COMPUTER AND A METHOD OF OPERATING A COMPUTER TO COMBINE DATA VALUES WITHIN A SINGULARLY ADDRESSABLE DATA STRING

[75] Inventor: Nathan M. Sidwell, St. Werburghs, United Kingdom

[73] Assignee: SGS-Thomson Microelectronics Limited, Almondsbury Bristol, United Kingdom

[21] Appl. No.: 661,077

[22] Filed: Jun. 10, 1996

[30] Foreign Application Priority Data

Jul. 18, 1995 [GB] United Kingdom .................... 9514695

[51] Int. Cl.$^6$ .................................................. G06F 9/302
[52] U.S. Cl. .............................................................. 395/562
[58] Field of Search ..................... 395/562, 563, 395/564

[56] References Cited

U.S. PATENT DOCUMENTS

| 4,424,563 | 1/1984 | Lynch .................................... 395/564 |
| 4,839,845 | 6/1989 | Rusterholz et al. ................... 364/736 |

FOREIGN PATENT DOCUMENTS

| A-0 165 539 | 12/1985 | European Pat. Off. . |
| A-0 231 526 | 12/1987 | European Pat. Off. . |
| A-0 530 372 | 3/1993 | European Pat. Off. . |

OTHER PUBLICATIONS

Standard Search Report issued by the European Patent Office dated Feb. 13, 1996.
Microprocessor Report, Dec. 5, 1994, pp. 16–18, L. Gwennap "UltraSparc Adds Multimedia Instructions".

P. Rony et al., "The 8080A Bugbook, Microcomputer Interfacing and Programming" 1977, Howard W. Sams & Co., Indianapolis, Indiana, USA.
Case, Brian, Philips hopes to displace DSPs with VLIW: TriMedia processors aimed at future multimedia embedded apps, Microprocessor Report, v8, n16, p. 12(4), Dec. 5, 1994, (text only).
Gwennap, Linley, Intel's MMX Speeds Multimedia, Instruction–Set Extensions to Aid Audio, Video, Speech, Microprocessor Report, v10, n3, pp. 1–6, Mar. 5, 1996.
Lee et al., 64–bit and Multimedia Extensions in the PA–RISC 2.0 Architecture, Proceedings of COMPCON '96, IEEE, 1996.
Sites, Richard L., editor, *Alpha Architecture Manual*, Digital Press, 1992, pp. 4–44 and 4–45.
Motorola, *MC88110 Second Generation RISC Microprocessor User's Manual*, 1991, pp. 5–1 through 5–25.

*Primary Examiner*—Richard L. Ellis
*Attorney, Agent, or Firm*—Wolf, Greenfield & Sacks, P.C.

[57] ABSTRACT

There is disclosed a computer and a method of operating a computer to allow combination of data values in the context of the execution of so-called "packed instructions". A data string comprising a certain number of sub-strings representing discrete data values and which are not independently addressable is held in a source register store. A combining instruction which operates to carry out a polyadic operation on at least some of the sub-strings to generate a result sub-string is then executed.

A result data string comprising said result sub-string is loaded into a destination register. These "combining" instructions have the advantage that they are general purpose instructions which can be used in a plurality of different situations. The instructions are particularly useful in a packed arithmetic environment.

36 Claims, 6 Drawing Sheets

PROCESSOR & MEMORY

PACKED UNIT

OBVIOUS PACKED ARITHMETIC

FIG. 3
SYMBOLS

| SYMBOL | OPERATION |
|---|---|
| (trapezoid symbol) | ARITHMETIC LOGIC UNIT. COMBINES THE TWO SOURCE VALUES IN SOME MANNER TO PRODUCE A RESULT. |
| R[3] R[2] R[1] R[0] | BUFFER. THIS PARTICULAR ONE HAS AN INPUT WHICH IS UNSEPARATED AND FOUR SEPARATED OUTPUTS, EACH TAKING ONE QUARTER OF THE INPUT SIGNALS. IT ALSO HAS AN OUTPUT ENABLE INPUT. |
| (multiplexer symbol) | MULTIPLEXER. THE OUTPUT CONSISTS OF ONE OF THE TWO INPUT SIGNALS. WHEN THE CONTROL SIGNAL IS NOT ASSERTED, THE UNSHADED INPUT SIGNAL IS OUTPUT. WHEN THE CONTROL SIGNAL IS ASSERTED, THE SHADED INPUT SIGNAL IS OUTPUT. |
| (changeover switch symbol) | CHANGEOVER SWITCH. EACH OF THE TWO OUTPUTS CONSISTS OF ONE OF THE INPUT SIGNALS. WHEN THE CONTROL SIGNAL IS NOT ASSERTED, THE UNSHADED INPUT GOES TO THE UNSHADED OUTPUT AND THE SHADED INPUT GOES TO THE SHADED OUTPUT. WHEN THE CONTROL SIGNAL IS ASSERTED, THE OUTPUTS SWAP OVER. |

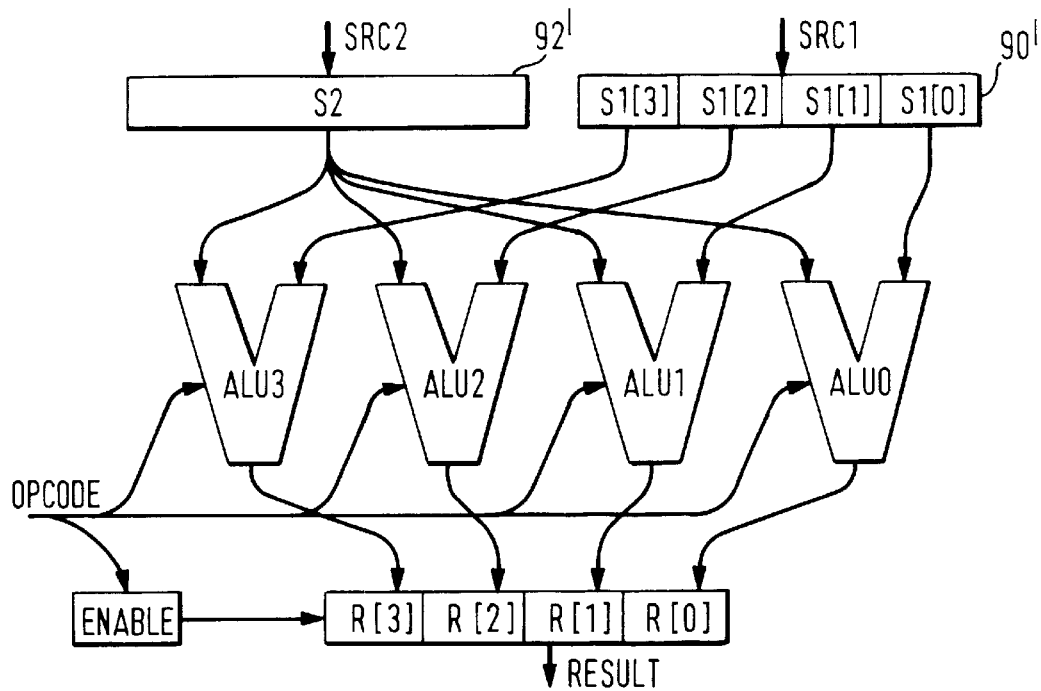
FIG. 5
OBVIOUS PACKED ARITHMETIC WITH UNPACKED OPERAND
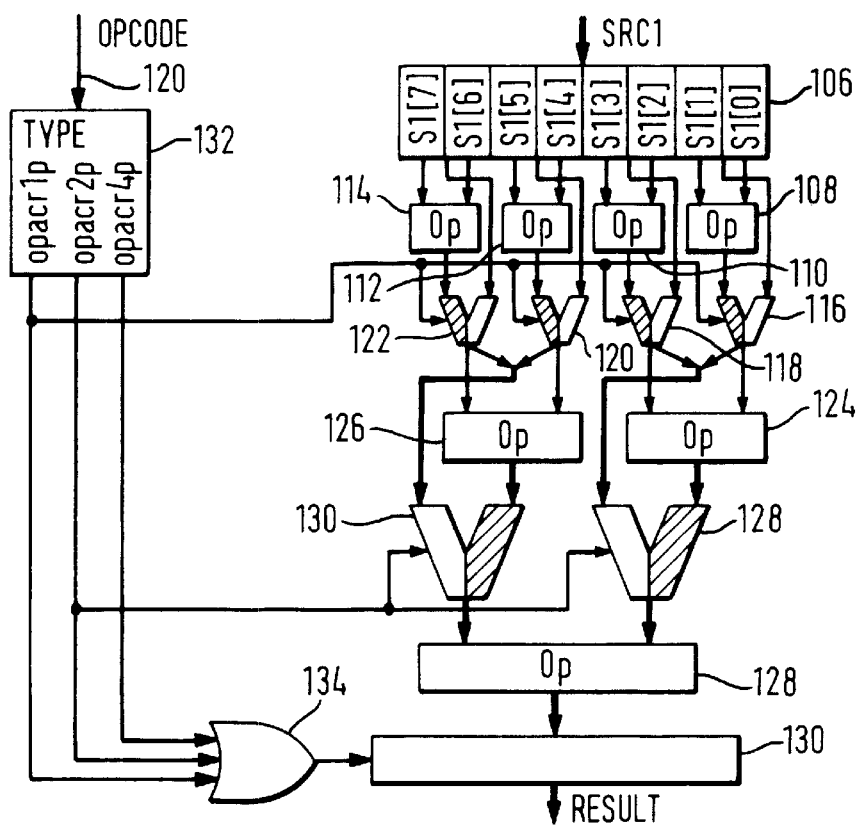
FIG. 6 COMBINE ACROSS

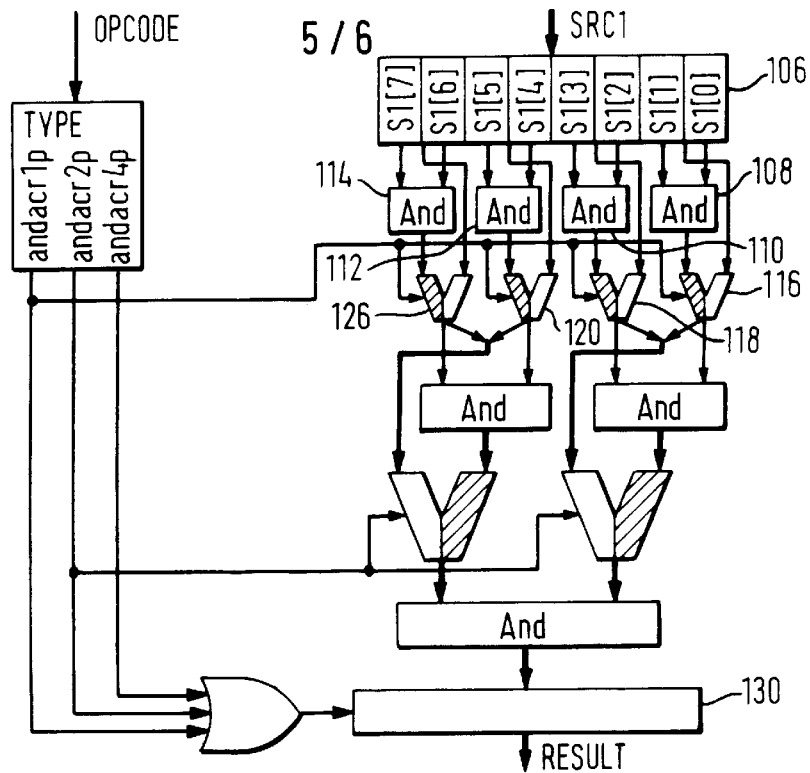
FIG. 7 AND ACROSS
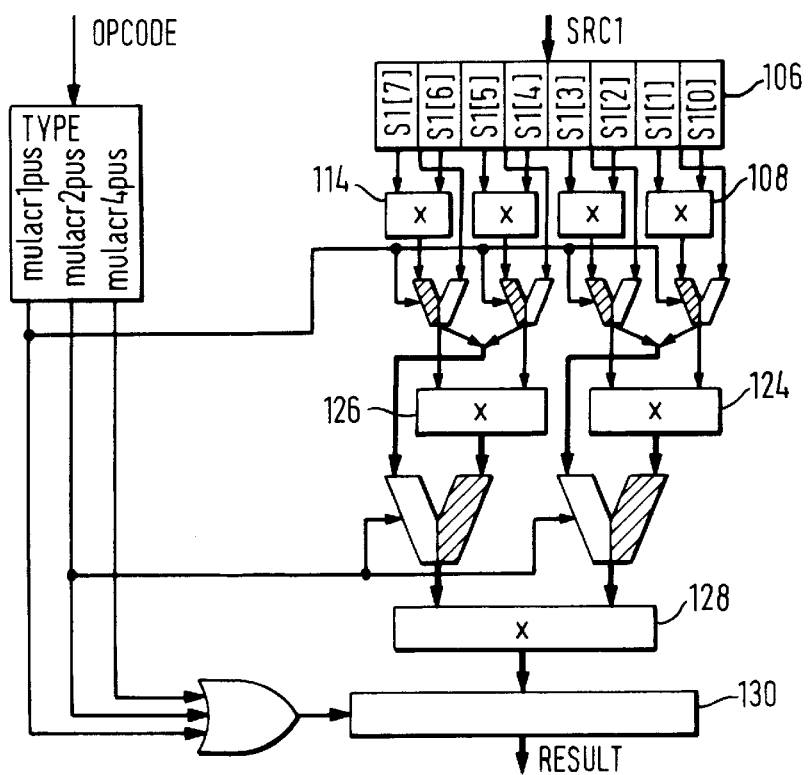
FIG. 8 MULTIPLY ACROSS

PARTIAL MULTIPLY ACROSS

COMPUTER AND A METHOD OF OPERATING A COMPUTER TO COMBINE DATA VALUES WITHIN A SINGULARLY ADDRESSABLE DATA STRING

FIELD OF THE INVENTION

This invention relates to combining data values.

The invention is concerned particularly but not exclusively with a computer and a method of operating a computer to allow combination of data values in the context of the execution of so-called "packed instructions".

BACKGROUND TO THE INVENTION

Packed instructions are carried out on packed operands. A packed operand comprises a data string consisting of a plurality of sub-strings, each defining a particular data value and referred to herein as "objects". Thus, an operand comprises a plurality of objects. Each operand is stored in a register store which has a predetermined bit capacity addressable by a single address and in which individual bit locations cannot be individually addressed. Thus, it is not possible to address and handle individual objects within each operand.

"Packed instructions" allow a common operation to be carried out on all of the objects within an operand without individually identifying them. A simple common operation is to load the operand into and out of memory.

Another "packed instruction" is an arithmetic instruction which performs the same arithmetic operation on pairs of objects from respective operands in parallel to provide a packed result operand comprising a plurality of result objects. For the execution of packed arithmetic instructions, a computer provides a packed arithmetic unit which operates on two source operands, at least one of which is packed, to generate a packed result.

It is clearly advantageous to deal with a set of objects in a single operand together, because it reduces loading and storing operations to memory and maximises the use of available register capacity by filling each register.

However, in a packed arithmetic environment, separate steps must be taken to deal with individual objects within an operand. That is, to add together objects within a single operand, each object would have to be separately loaded into a register store before it could be combined with another object. This not only wastes register capacity but also requires memory accesses, which can be slow. It further requires a plurality of instructions, which increases the length of instruction sequences.

In an article entitled "UltraSpark adds Multimedia Instructions" in Microprocessor Report of 5th Dec. 1994, an instruction entitled PDIST exists. This instruction is a single instruction which acts on the contents of a register which holds eight data values resulting from a partition substraction of two 64 bit registers. The instruction adds together the absolute value of each of the eight results. Each result represents the difference of the objects within the 64 bit registers. The PDIST instruction then further adds the resulting sum to the accumulated difference value.

The PDIST instruction is therefore a highly specialised instruction for performing one particular cumulative operation.

SUMMARY OF THE INVENTION

According to the present invention in one aspect there is provided a method of operating a computer which method comprises holding in a source register store having a predetermined bit capacity addressable by a single address a data string comprising a first number of sub-strings representing discrete data values and arranged at successive locations in the data string, wherein said sub-strings are not independently addressable and executing an instruction sequence including a combining instruction which operates to carry out a polyadic operation on at least some of said sub-strings to generate a result sub-string which is included in a result data string comprising a second number of sub-strings less than said first number, wherein the result data string is loaded into a destination register store having a predetermined bit capacity addressable by a single address.

The combining instruction can carry out a polyadic operation on all of the sub-strings in the data string of the source register store to generate a result data string comprising a single result sub-string. This is referred to herein as a "combine across" instruction.

Alternatively, the combining instruction can carry out a first polyadic operation on some of the sub-strings to generate a first result sub-string and a second polyadic operation on the remaining sub-strings to generate a second result sub-string, the result data string consisting of the first and second result sub-strings. This is referred to herein as a "partial combine across" instruction.

The polyadic operation can be an arithmetic or a logical operation.

The invention also provides in another aspect a computer having a processor, memory and data storage circuitry comprising at least source and destination register stores each having a predetermined bit capacity addressable by a single address, the source register store holding a data string comprising a first number of sub-strings representing discrete data values and arranged at successive locations in the data string, wherein said sub-strings are not independently addressable, said computer having stored in said memory an instruction sequence comprising at least a combining instruction which operates to carry out a polyadic operation on at least some of said sub-strings to generate a result sub-string which is included in a result data string comprising a second number of sub-strings less than said first number, wherein the result data string is loaded into said destination register store.

The invention further provides a computer having a processor, memory and data storage circuitry for holding at least first and second data strings of a predetermined bit length and each comprising a plurality of sub-strings representing discrete data values and arranged at successive locations in the data string, each substring being of the same bit length, said computer having stored in said memory an instruction sequence comprising a first instruction which performs an arithmetical operation on sub-strings of the first and second data strings located at common respective locations in the first and second data strings to generate a resultant data string of said predetermined bit length comprising a plurality of substrings representing discrete result data values, and a second, combining, instruction which effects a polyadic operation on at least some of said substrings within said resultant data string to generate a combined value as a bit sequence having a length no greater than said predetermined bit length.

The data storage circuitry can comprise a plurality of register stores each of said predetermined bit length and addressable by a single address, the resultant data string being held in a first one of the register stores and the combined value being held in a second one of the register stores.

In a further aspect, the invention provides a method of operating a computer which method comprises holding in data storage at least first and second data strings of a predetermined bit length and each comprising a plurality of sub-strings representing discrete data values and arranged at successive locations in the data string, each sub-string being of the same bit length, said method further comprising executing an instruction sequence including a first instruction which performs an arithmetical operation on sub-strings of the first and second data strings located at common respective locations in the first and second data strings to generate a resultant data string of said predetermined bit length comprising a plurality of sub-strings representing discrete result data values, and a second, combining, instruction which effects a polyadic operation on at least some of said sub-strings within said resultant data string to generate a combined value as a bit sequence having a length no greater than said predetermined bit length.

The "combine across" and "partial combine across" instructions in accordance with this invention have the advantage that they are general purpose instructions which can be used in a plurality of different situations, with the result data string being loaded into a destination register store at the termination of each instruction. The instructions are particularly useful in a packed arithmetic environment.

For a better understanding of the present invention and to show how the same may be carried into effect, reference will now be made by way of example to the accompanying drawings.

BRIEF DESCRIPTION OF THE DRAWINGS

FIG. 3 shows the meaning of symbols used in the figures;

FIG. 5 is a block diagram of an obvious packed arithmetic unit which operates on a packed source operand and an unpacked source operand;

FIG. 6 is a schematic diagram of a combine across unit;

FIG. 7 is a schematic diagram of a multiply across unit;

FIG. 8 is a schematic diagram of an and across unit; and

DESCRIPTION OF THE PREFERRED EMBODIMENT

Figure 1:
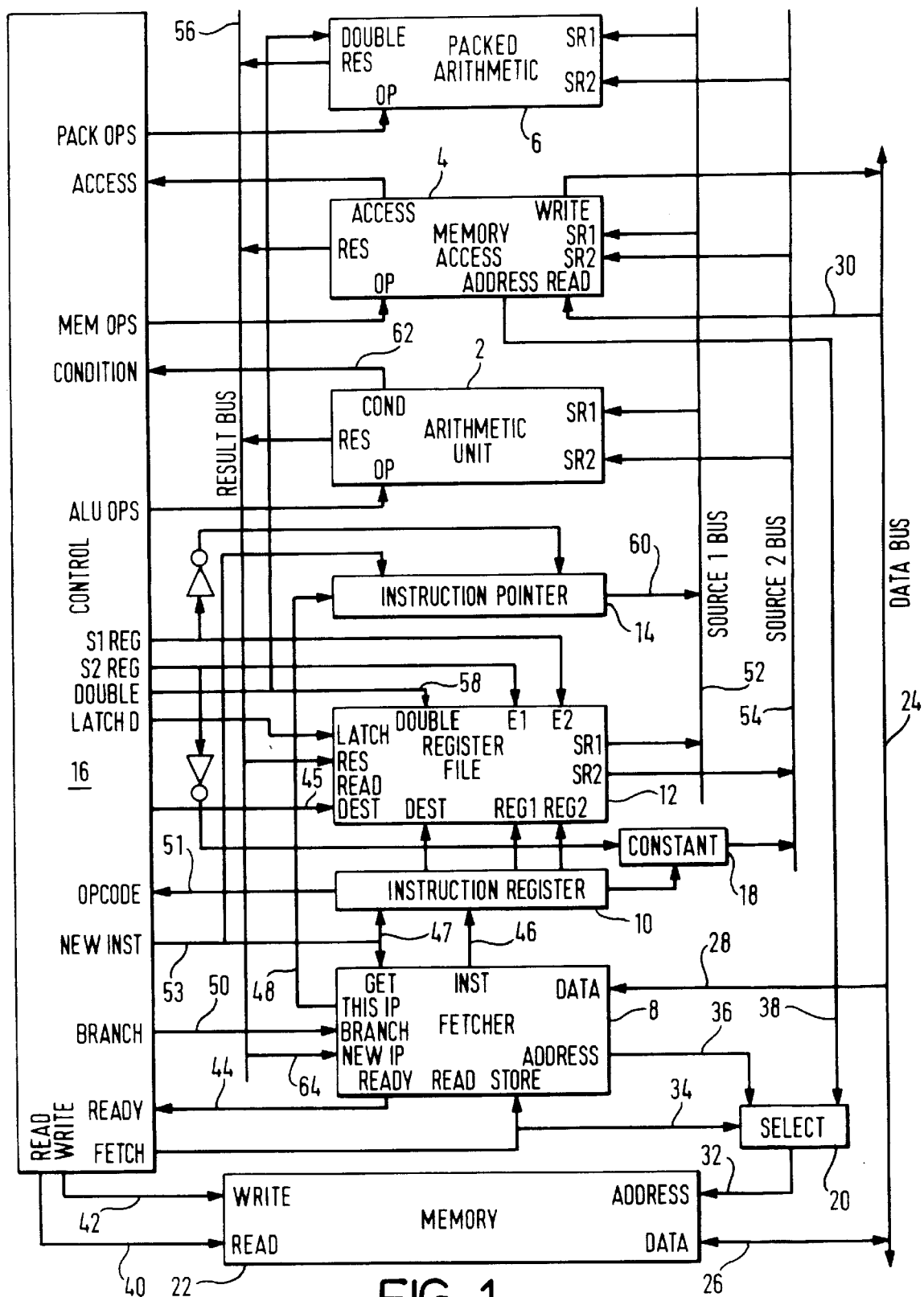
FIG. 1 is a block diagram of a processor and memory of a computer.

FIG. 1 shows a processor in accordance with one embodiment of the present invention. The processor has three execution units including a conventional arithmetic unit 2 and a memory access unit 4. In addition there is a packed arithmetic unit 6. The processor also includes an instruction fetcher 8, an instruction register 10, a register file 12 and an instruction pointer 14 all of which operate under the control of a control unit 16 of the processor. The register file comprises a set of registers each having a predetermined bit capacity and each being addressable with a single address. It is not possible to address individual locations within a register. When a register is accessed, the entire contents of the register are concerned. The processor further includes a constant unit 18 and a select unit 20. The constant unit 18 and select unit 20 are also operated under the control of the control unit 16. The processor operates in conjunction with a memory 22 which holds instructions and data values for effecting operations of the processor. Data values and instructions are supplied to and from the memory 22 via a data bus 24. The data bus 24 supplies data values to and from the memory 22 via a memory data input 26. The data bus 24 also supplies data to the instruction fetcher 8 via a fetcher data input 28 and to the memory access unit 4 via a memory access read input 30. The memory is addressed via the select unit 20 on address input 32. The select unit 20 is controlled via a fetch signal 34 from the control unit 16 to select an address 36 from the fetcher 8 or an address 38 from the memory access unit 4. Read and write control lines 40,42 from the control unit 16 control read and write operations to and from the memory 22. The instruction fetcher 8 fetches instructions from the memory 22 under the control of the control unit 16 as follows. An address 36 from which instructions are to be read is provided to the memory 22 via the select unit 20. These instructions are provided via the data bus 24 to the fetcher data input 28. When the instruction fetcher has fetched its next instruction, or in any event has a next instruction ready, it issues a Ready signal on line 44 to the control unit 16. The instruction which is to be executed is supplied to the instruction register 10 along instruction line Inst 46 and held there during its execution. The instruction pointer 14 holds the address of the instruction being executed supplied to it from the fetcher 8 via instruction pointer line 48. A Get signal 47 responsive to a New Inst signal 53 from the control unit 16 causes the instruction register 10 to store the next instruction on Inst line 46 and causes the fetcher 8 to prepare the next instruction. The New Inst signal 53 also causes the instruction pointer 14 to store the address of the next instruction. A branch line 50 from the control unit 16 allows the instruction fetcher 8 to execute branches.

The instruction register 10 provides Source 1 and Source 2 register addresses to the register file 12 as Reg1 and Reg2. A result register address is provided as Dest. Opcode is provided to the control unit 16 along line 51. In addition, some instructions will provide a constant operand instead of encoding one or both source registers. The constant is provided by the constant unit 18. The instruction's source values are provided on Source 1 and Source 2 busses 52,54 by the appropriate settings of the S1 Reg and S2 Reg signals at inputs E1,E2. The correct execution unit is enabled by providing the appropriate values for Pack Ops, Mem Ops and ALU Ops signals from the control unit 16 in accordance with the Opcode on line 51. The enabled unit will normally provide a result Res on a result bus 56. This is normally stored in the selected result register Dest in the register file 12. There are some exceptions to this.

Some instructions provide a double length result. These store the first part of the result in the normal way. In a subsequent additional stage, the second part of the result is stored in the next register in the register file 12 by asserting a Double signal 58.

Branches 50 need to read and adjust the instruction pointer 14. These cause the Si Reg signal not to be assert ed, and so the instruction pointer 14 provides the Source 1 value on line 60. The Source 2 value is provided in the normal way (either from a register in the register file 12, or the constant unit 18). The a rithmetic unit 2 executes the branch calculations and it s result is stored into the fetcher 8 on the New IP input 64, rather than the register file 12, signalled by the Branch line 50 from the control unit 16. This starts the fetcher from a new address.

Conditional branches must execute in two stages depending on the state of condition line 62. The firs t stage uses the Dest register as another source, by asserting a Read Dest signal 45. If the condition is satisfied, then the normal branch source operands are read and a branch is executed.

Calls must save a return address. This is done by storing the instruction pointer value in a destination register prior to calculating the branch target.

The computer described herein has several important qualities.

Source operands are always the natural word length. There can be one, two or three source operands.

The result is always the natural word length, or twice the natural word length. There is a performance penalty when it is twice the natural word length as it takes an extra stage to store and occupies two, rather than one, registers. For this computer, assume a natural word length of 64 bits. That is, each register in the register file has a predetermined capacity of 64 bits.

The execution units 2,4,6 do not hold any state between instruction execution. Thus subsequent instructions are independent.

Non-Packed Instructions

The arithmetic unit 2 and memory access unit 4, along with the control unit 16 can execute the following instructions of a conventional instruction set. In the following definitions, a register is used to denote the contents of a register as well as a register itself as a storage location, in a manner familiar to a person skilled in the art.

| | |
|---|---|
| mov | Move a constant or a register into a register |
| add | Add two registers together and store the result in a third register (which could be the same as either of the sources) |
| sub | Subtract two registers and store the result in a third register |
| load | Use one register as an address and read from that location in memory, storing 'the result into another register |
| store | Use one register as an address and store the contents of another register into memory at the location specified by the address |
| cmpe | Compare two registers (or a register and a constant) for equality. If they are equal, store 1 into the destination register otherwise store zero |
| cmpge | Compare two registers (or a register and a constant) for orderability. If the second is not less than the first, store 1 into the destination register otherwise store zero |
| jump | Unconditional jump to a new location |
| jumpz | Jump to a new program location, if the contents of a specified register is zero |
| jumpnz | Jump to a new program location, if the contents of a specified register is not zero |
| shr | Perform a bitwise right shift of a register by a constant or another register and store the result in a destination register. The shift is signed because the sign bit is duplicated when shifting. |
| shl | Perform a bitwise left shift of a register by a constant or another register and store the result in a destination register |
| or/xor | Perform a bit-wise logical operation (or/xor) on two registers and store result in destination register. |

Packed Unit

Figure 2:
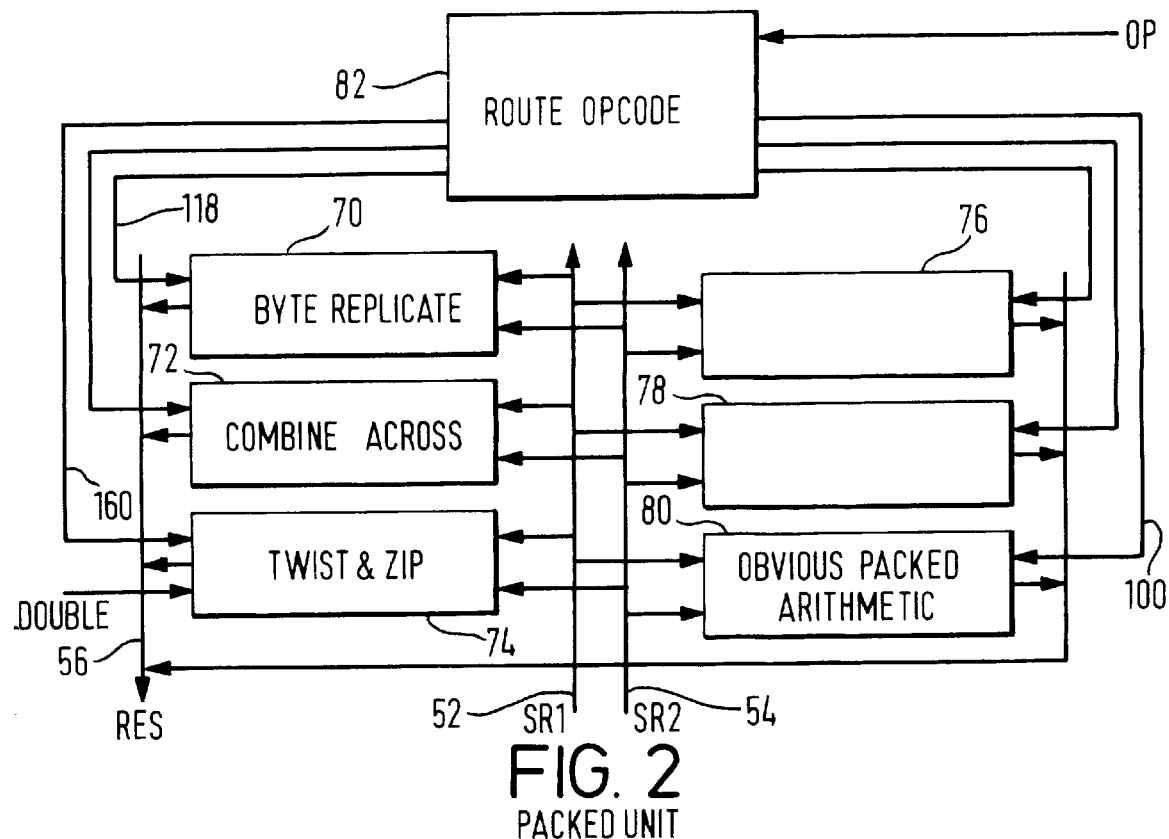
FIG. 2 is a block diagram of a packed arithmetic unit.

FIG. 2 shows in a block diagram the packed arithmetic unit 6. This is shown as a collection of separate units each responsible for some subset of packed arithmetic instructions. It is quite probable that another implementation could combine the functions in different ways. The units include a byte replicate unit 70, a combine-across unit 72, a twist and zip unit 74, an obvious packed arithmetic unit 80 and other packed arithmetic units 76,78. The combine-across unit and the obvious packed arithmetic unit are described in more detail herein. These are operated responsive to a route opcode unit 82 which selectively controls the arithmetic units 70 to 80. Operands for the arithmetic units 70 to 80 are supplied along the Source 1 and Source 2 busses 52,54. Results from the arithmetic units are supplied to the result bus 56. The op input to the route opcode unit 82 receives the Pack Ops instruction from the control unit 16 (FIG. 1). It will be appreciated that the operands supplied on the Source 1 and Source 2 busses are loaded into respective input buffers of the arithmetic to units and the results supplied from one or two output buffers to one or two destination registers in the register file 12.

Obvious Packed Arithmetic

The obvious packed arithmetic unit 80 performs operations taking the two source operands as containing several packed objects each and operating on respective pairs of objects in the two operands to produce a result also containing the same number of packed objects as each source. The operations supported can be addition, subtraction, comparison, multiplication, left shift, right shift etc. As explained above, by addressing a register using a single address an operand will be accessed. The operand comprises a plurality of objects which cannot be individually addressed.

FIG. 3 shows the symbols used in the diagrams illustrating the arithmetic units of the packed arithmetic unit 6.

Figure 4:
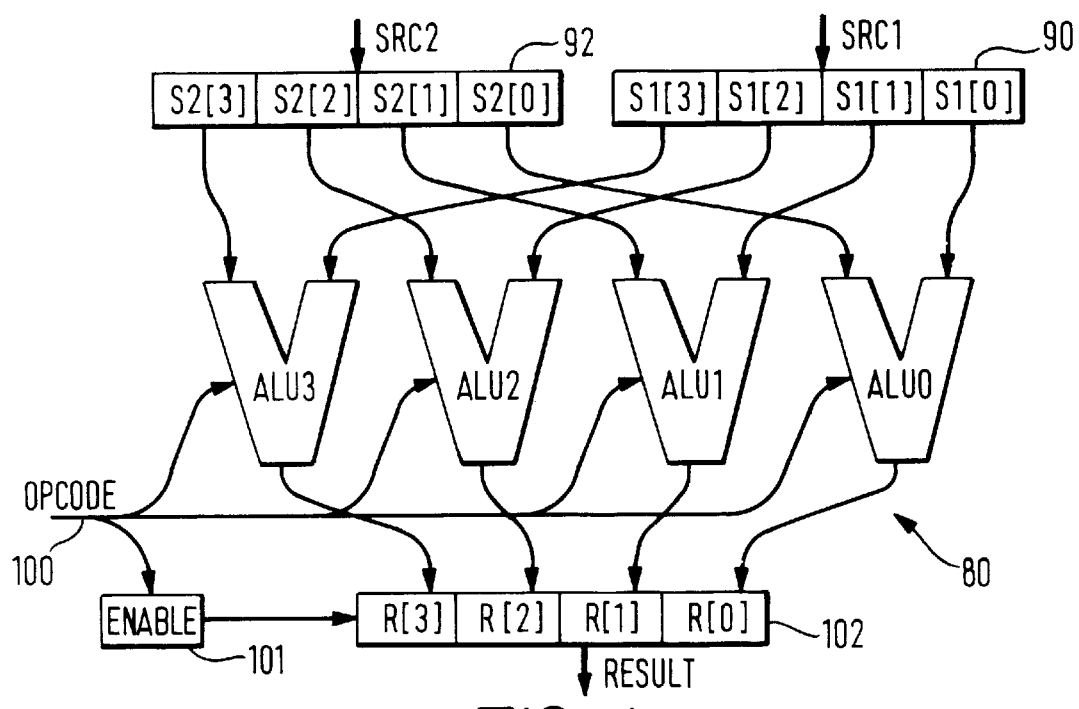
FIG. 4 is a block diagram of an obvious packed arithmetic unit operating on two packed source operands.

FIG. 4 shows an obvious packed arithmetic unit which can perform addition, subtraction, comparison and multiplication of packed 16 bit numbers. As, in this case, the source and result bus widths are 64 bit, there are four packed objects, each 16 bits long, on each bus.

The obvious packed arithmetic unit 80 comprises four arithmetic logical units ALU0–ALU3, each of which are controlled by opcode on line 100 which is derived from the route opcode unit 82 in FIG. 3. The 64 bit word supplied from source register 1 SRC1 contains four packed objects S1[0]–S1[3]. The 64 bit word supplied from source register 2 SRC2 contains four packed objects S2[0]–S2[3]. These are stored in first and second input buffers 90,92. The first arithmetic logic unit ALUO operates on the first packed object in each operand, S1[0] and S2[0] to generate a result R[0]. The second to fourth arithmetic logic units ALU1–ALU3 similarly take the second to fourth pairs of objects and provide respective results R[1] to R[3]. These are stored in a result buffer 102. The result word thus contains four packed objects. An enable unit 101 determines if any of the units should be active and controls whether the output buffer asserts its output.

The instructions are named as follows:

| | |
|---|---|
| add2p | Add each respective S1[i] to S2[i] as 2's complement numbers producing R[i]. Overflow is ignored. |
| sub2p | Subtract each respective S2[i] from S1[i] as 2's complement numbers producing, R[i]. Overflow is ignored. |
| cmpe2p | Compare each respective S1[i] with S2[i] If they are equal, set R[i] to all ones; if they are different, set R[i] to zero. |
| cmpge2ps | Compare each respective S1[i] with S2[i] as signed 2's complement numbers. If S1[i] is greater than or equal to S2[i] set R[i] to all ones; if S1[i] is less than S2[i] set R[i] to zero. |

| | |
|---|---|
| mul2ps | Multiply each respective S1[i] by S2[i] as signed 2's complement numbers setting R[i] to the least significant 16 bits of the full (32 bit) product. |

Some obvious packed arithmetic instructions naturally take one packed source operand and one unpacked source operand. FIG. 5 shows such a unit.

The contents of the packed arithmetic unit of FIG. 5 are substantially the same as that of FIG. 4. The only difference is that the input buffer 92' for the second source operand receives the source operand in unpacked form. The input buffer 92' receives the first source operand in packed form as before. One example of instructions using an unpacked source operand and a packed source operand are shift instructions, where the amount to shift by is not packed, so that the same shift can be applied to all the packed objects. Whilst it is not necessary for the shift amount to be unpacked, this is more useful.

| | |
|---|---|
| shl2p | Shift each respective S1[i] left by S2 (which is not packed), setting R[i] to the result. |
| shr2ps | Shift each respective S1[i] right by S2 (which is not packed), setting R[i] to the result. The shift is signed, because the sign bit is duplicated when shifting. |

It is assumed that the same set of operations are provided for packed 8 bit and packed 32 bit objects. The instructions have similar names, but replacing the "2" with a "1" or a "4".

Combine Across Unit

The combine across unit 72 can include selectively one or both of a combine across unit and a partial combine across unit. A combine across unit will firstly be described with reference to FIG. 6. This unit performs combine across operations for 8 bit, 16 bit and 32 bit objects. The combining operation is associative, therefore the output from one stage can be used as an input for the next, wider stage. Each operation produces no more bits than the sum of the source bit string length. Suitable operations are addition, multiplication and bit-wise logical operations (and, or, exclusive OR).

The combine across unit of FIG. 6 comprises an input buffer 106 which has a capacity of 64 bits and which is illustrated in FIG. 6 as holding eight 8 bit objects S1[0] to S1[7]. When a combine across instruction is to be executed, the contents of a source register is loaded into the input buffer 106 along the line indicated as SRC1. A first stage of the combine across unit has four operators labelled 108 to 114. Each operator takes two objects and carries out a polyadic associative operation to generate a result. The output of each operator is fed to a respective input of each of four multiplexors 116 to 122. The other input of each multiplexor receives two 8 bit objects taken together, for the situation where objects have a different length. The outputs of a first two of the multiplexors 116,118 is supplied to a first operator 124 in a second stage of the combine across unit. The outputs of the other two multiplexors 120,122 are supplied tb a second operator 126 in the second stage. Outputs from the first and second operators 124,126 of the second stage are supplied to inputs of respective multiplexors 128,130. The other inputs of these multiplexors 128,130 are supplied from the combined outputs of the first two multiplexors 116,118 and the second two multiplexors 120, 122 respectively. Outputs of the multiplexors 128,130 are supplied to a final operator 128 which carries out an associative polyadic operation to generate a result. The result is held in a result buffer 130. The result can be supplied to a destination register along the line marked Result.

The combine across unit of FIG. 6 also includes a type unit 132 for determining the type of combine across instruction to be executed by the unit. The type unit 132 is controlled by opcode on line 120 from the route opcode unit 82 in FIG. 2. The type unit 132 issues one of three signals opacr1p, opacr2p and opacr4p in dependence on the type of instruction to be executed as determined by the opcode. The opacr1p signal controls the multiplexors associated with the first stage 116–122. The opacr2p signal controls the multiplexors of the second stage 128,130. All three signals are supplied to an OR gate 134, the output of which controls the output buffer 130.

In this way, the size of the objects can be altered in accordance with the type of combine across instruction to be executed.

In one example, the combining operator is addition. For that implementation, the three instructions which can be processed by the combine across unit are:

| | |
|---|---|
| addacr1pus | Add packed 8 bit objects as unsigned numbers. |
| addacr2ps | Add packed 16 bit objects as signed 2's complement numbers. |
| addacr4ps | Add packed 32 bit objects as signed 2's complement numbers. |

FIG. 7 shows an implementation of the combine across unit of FIG. 6 when the combining operation is an and operation. Because the and operation produces a result of the same width as the source operands, each anding unit 108 to 114 produces the result of twice its source object widths by zero extension. In FIG. 7, like numerals denote like parts as in FIG. 6. With the unit of FIG. 7, the following three instructions may be implemented:

| | |
|---|---|
| andacr1p | And all eight packed bytes of the source operand together producing an 8 bit result which is zero extended to the result buffer size. |
| andacr2p | And all four packed 2-bytes of the source operand together producing a 16 bit result which is zero extended to the result buffer size. |
| andacr4p | And both packed 4-bytes of the source operand together producing a 16 bit result which is zero extended to the result buffer size. |

FIG. 8 is a schematic diagram of a combine across unit for implementing a multiplication operation as the combining operation. Like numerals denote like parts as in FIGS. 6 and 7. The only difference is that the operating units 108 to 114,124,126,128 are multiplication units instead of anding units.

The multiply across unit of FIG. 8 can implement the following three instructions:

| | |
|---|---|
| mulacr1pus | Multiply all eight packed unsigned bytes of the source operand together. |
| mulacr2pus | Multiply all four packed unsigned 2-bytes of the source operand together. |
| mulacr4pus | Multiply both packed unsigned 4-bytes of the source operand together. |

Figure 9:
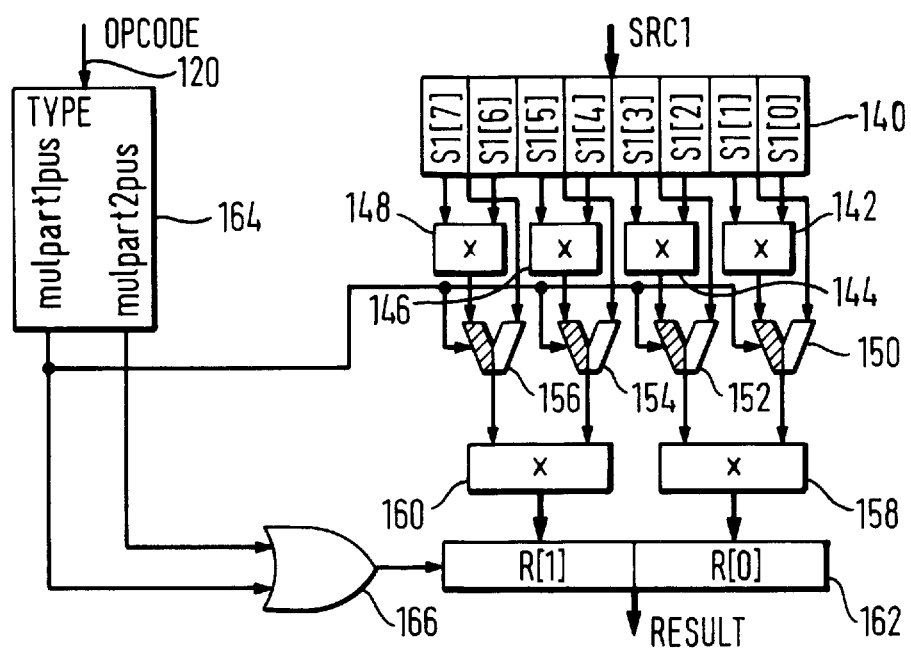
FIG. 9 is a schematic diagram of a partial multiply across unit.

It is not necessary to combine all the packed objects in a single operand together. Several separate combination operations can be performed, each using a different set of source objects, to produce part of a packed result. FIG. 9 shows a partial multiply across unit. In FIG. 9, reference numeral 140 denotes an input buffer of the same type as the input buffer 106 of the combine across unit of FIG. 6, holding packed 8 bit objects S1[0]–S1[7]. There is a first stage of multipliers 142 to 148 and a first stage of multiplexors 150 to 156 which are connected in the same way as the first stage of FIG. 6. Outputs of a first set of the multiplexors 150,152 are supplied to a multiplier 158 and outputs of a second set of the multiplexors 154,156 are supplied to a multiplier 160. Outputs of the multipliers 158,160 are supplied directly to an output buffer 162 which holds two result objects R[0], R[1]. A type unit 164 receives opcode on line 120 and generates responsive to that opcode one of two signals mulpart1pus, mulpart2pus. The signal mulpart1pus controls the multiplexors 150 to 156 of the first stage. The signals mulpart1pus and mulpart2pus are supplied to an OR gate 166, the output of which controls the output buffer 162.

The partial multiply across unit can execute the following instructions:

| | |
|---|---|
| mulpart1pus | Multiply S1[0] to S1[3] together to produce R[0] and separately multiply S1[4] to S1[7] together to produce R[1]. |
| mulpart2pus | Take the source as four 2-byte objects (thus each even and odd part of S1[2i] and S1[2i+1] in FIG. 5 corresponds to a single source object) and multiply them in pairs to produce R[0] and R[1] |

The combine across implementation can be extended to use two source operands, but still produce a single width result. The minimum number of source objects used to make each result object is then more constrained, depending on the operation being performed. For instance if adding is performed, at least three source objects must be combined for each result object.

One example of the use of a combine across instruction is to perform a vector sum, using the instruction addacr2ps.

Summing a vector can be done by loading several items into a single register and then either adding them across and adding the result to the running total, or performing a packed add to a running total which is finally added across. The first method requires more instructions, but cannot overflow whereas the second uses fewer instructions but can overflow.

The code for the first method is shown in appendix A(i).

The code for the second method is shown in appendix A(ii).

An example of a partial combine across is an application to average adjacent values in an array. If the array values are 16 bits each, then four can be held in a single 64 bit register. Summing these pair-wise will produce two 32 bit values. For this example, a partial add across unit is required. Such a unit will be constructed in the manner of FIG. 9, but replacing the multipliers by adding operators. The following instruction can then be implemented:

| | |
|---|---|
| addpart2ps | Has a single source operand of four packed 16 bit objects and produces a packed result of two packed 32 bit objects. Each generated as the sum of two of the source packed objects. |

The code given in appendix A(iii) will average adjacent values.

appendix A (i)

```
;vector sum of 16-bit objects using individual add acrosses
;R1 points to the vector
;R2 contains the number of vector elements/8
mov       R3,0              ;clear total
loop:
load      R4,R1             ;get four elements of the vector
add       R1,R1,8           ;increment the pointer
addacr2ps R4,R4             ;add the four elements
add       R3,R3,R4          ;add into total
sub       R2,R2,1           ;decrement count
jumpnz    R2,loop           ;repeat if more
;the total is in R3
``` appendix A (ii)

```
;vector sum of 16-bit objects using individual add acrosses
;R1 points to the vector
;R2 contains the number of vector elements/8
mov       R3,0              ;clear total
loop:
load      R4,R1             ;get four elements of the vector
add       R1,R1,8           ;increment the pointer
add2ps    R3,R3,R4          ;add into total
sub       R2,R2,1           ;decrement count
jumpnz    R2,loop           ;repeat if more
addacr2ps R3,R3             ;add the four parts of the total
;the total is in R3
``` appendix A (iii)

```
;register @src points to the start of the source array
;register @res points to the start of the result array
mov        @i,N/4           ;load size of array
loop:
load       @temp,@ary       ;load 4 values
add        @ary,@ary,8      ;move to next location
addpart2ps @temp,@temp      ;do the partial sum
shr4ps     @temp,@temp,1    ;packed shift right to divide by 2
store      @temp,@res
add        @res,@res,8      ;move to next location
sub        @i,@i,1          ;decrement counter
jumpnz     loop-$,@i
```

What is claimed is:

1. A method of operating a computer comprising step of:
    holding a source data string in a source storage element having a predetermined bit capacity, the source data string including a first number of source sub-strings representing discrete data values and arranged at successive locations in the source data string, the source storage element being addressable by a single address so that the source sub-strings are not independently addressable from the source storage element;
    executing an instruction sequence including a first combining instruction selected from a plurality of combining instructions, each combining instruction for combining at least two of the source sub-strings within the source data string the first combining instruction performing a polyadic operation of a type defined by the first combining instruction on at least some of the source sub-strings to generate at least one combined sub-string;
    forming a result data string that includes a second number of result sub-strings less than the first number at least one of the second number of result sub-strings being identical to the at least one combined sub-string; and
    loading the result data string into a destination storage element that has a predetermined bit capacity and is addressable by a single address.

2. The method according to claim 1, wherein the first combining instruction performs the polyadic operation on all of the source sub-strings in the source data string held in the source storage element and generates the result data string to have a single result sub-string.

3. The method according to claim 1, wherein:

the first combining instruction performs a first polyadic operation on at least some of the source sub-strings to generate a first combined sub-string and a second polyadic operation on the remaining source sub-strings to generate a second combined sub-string;

one of the second number of result sub-strings is identical to the first combined sub-string; and another of the second number of result sub-strings is identical to the second combined sub-string.

4. The method according to claim 1, wherein the polyadic operation is an arithmetic operation.

5. The method according to claim 1, wherein the polyadic operation is a logical operation.

6. The method according to claim 1, further comprising a step of using the result data string in a subsequent instruction that is independent from the first combining instruction.

7. A computer comprising:

a processor including a plurality of execution units;

data storage circuitry including at least source and destination storage elements to hold a source data string and a result data string, respectively, each storage element having a predetermined bit capacity, the source data string including a first number of source sub-strings representing discrete data values and arranged at successive locations in the source data string, the source storage element being addressable by a single address so that the source sub-strings are not independently addressable from the source storage element; and a memory that stores an instruction sequence including at least one combining instruction selected from a plurality of combining instructions, each combining instruction for combining at least two of the source sub-strings within the source data string;

wherein the processor is programmed so that the at least one combining instruction causes at least one of the execution units to perform a polyadic operation, of a type defined by the at least one combining instruction, on at least some of the source sub-strings held in the source storage element, to generate at least one combined sub-string, the result data string including a second number of sub-strings less than said first number. at least one of the second number of sub-strings being identical to the at least one combined sub-string.

8. The computer according to claim 7, wherein the processor is programmed such that the at least one combining instruction performs the polyadic operation on all of the source sub-strings in the source data string and generates the result data string to have a single sub-string.

9. The computer acctording to claim 7, wherein:

the at least one combining instruction performs a first polyadic operation on at least some of the source sub-strings to generate a first combined sub-string and a second polyadic operation on the remaining source sub-strings to generate a second combined sub-string;

one of the second number of result sub-strings is identical to the first combined sub-string; and another of the second number of result sub-strings is identical to the second combined sub-string.

10. The computer according to claim 7, wherein the result data string is available for use by a subsequent instruction that is independent from the at least one combining instruction.

11. A computer comprising:

a processor;

data storage circuitry to hold at least first and second source data strings and a second resultant data string each of a predetermined bit length, each source data string including a plurality of source sub-strings representing discrete data values and arranged at successive locations in the source data string, each source sub-string being of the same bit length; and a memory that stores an instruction sequence including at least a first instruction and a combining instruction;

wherein the processor is programmed so that;

the first instruction performs an arithmetical operation on the source sub-strings of the first and second source data strings located at corresponding locations in the first and second source data strings to generate a first resultant data string having the predetermined bit length, the first resultant data string including a plurality of first result sub-strings representing discrete result data values; and the combining instruction combines at least some of the first result sub-strings within the first resultant data string by performing a polyadic operation on the at least some of the first result sub-strings to generate at least one combined sub-string, the second resultant data string including a plurality of second result sub-strings at least one of the second result sub-strings being identical to the at least one combined sub-string.

12. The computer according to claim 11, wherein the data storage circuitry includes a plurality of storage elements, each storage element having the predetermined bit length and being addressable by a single address so that the sub-strings are not independently addressable, the first resultant data string being held in a first one of the storage elements and the second resultant data string being held in a second one of the storage elements.

13. The computer according to claim 11, wherein the combining instruction combines all of the first result sub-strings in the first resultant data string.

14. The computer according to claim 11, wherein the combining instruction additionally performs a polyadic operation on remaining first result sub-strings of the first resultant data string to generate a second combined sub-string.

15. A method of operating a computer comprising steps of:

holding in data storage at least first and second source data strings and a second resultant data string each of a predetermined bit length, each source data string including a plurality of source sub-strings representing discrete data values and arranged at successive locations in the source data string, each source sub-string being of the same bit length; and executing an instruction sequence including:

a first instruction which performs an arithmetical operation on the source sub-strings of the first and second source data strings, located at corresponding locations in the first and second source data strings, to generate a first resultant data string of the predetermined bit length, the first resultant data string including a plurality of first result sub-strings representing discrete result data values; and a combining instruction which combines at least some of the first result sub-strings within the first resultant data string by performing a polyadic operation on the at least some of the first result sub-strings to generate at least one combined sub-string, the second resultant data string including a plurality of second result sub-strings, at least one of the second result sub-strings being identical to the at least one combined sub-string.

16. The method according to claim 15, wherein the data storage includes a plurality of storage elements, each having the predetermined bit length and being addressable by a single address so that the sub-strings are not independently addressable from any of the storage elements, the first resultant data string being held in a first one of the storage elements and the second resultant data string being held in a second one of the storage elements.

17. The method according to claim 15 or 16, wherein the combining instruction combines all of the first result sub-strings in the first resultant data string.

18. The method according to claim 15 or 16, wherein the combining instruction additionally performs a polyadic operation on remaining first result sub-strings of the first resultant data string to generate a second combined sub-string.

19. The method according to claim 15 or 16, wherein the combining instruction carries out a logical operation to combine first result sub-strings within the first resultant data string.

20. The method according to claim 15 or 16, wherein the combining instruction carries out an arithmetical operation to combine first result sub-strings within the first resultant data string.

21. A method of operating a comp-uter, comprising step of:

holding a source data string in a source storage element, the source data string including a first number of source sub-strings, the source storage element being addressable by a single address so that the source sub-strings are not independently addressable from the source storage element;

executing an instruction sequence including a first combining instruction, selected from a plurality of combining instructions, each combining instruction for combining a plurality of the source sub-strings within the source data string, the first combining instruction performing an operation on at least two source sub-strings to generate at least one combined sub-string;

forming a result data string that includes a second number of result sub-strings less than the first number, at least one of the second number of result sub-strings being identical to the at least one combined sub-string; and loading the result data string into a destination storage element.

22. The method according to claim 21, flrther comprising a step of using the result data string in a subsequent instruction that is independent from the first combining instruction.

23. The method according to claim 21, wherein each of the source sub-strings represents discrete data values.

24. The method according to claim 21, wherein each of the source sub-strings has a selectable bit length.

25. The method according to claim 24, wherein the first combining instruction specifies a bit length for the at least two source sub-strings.

26. The method according to claim 21, wherein the first combining instruction performs a polyadic operation of a type defmed by the first combining instruction.

27. The method according to claim 21, wherein the second number of result sub-strings is less than the first number of sub-strings.

28. The method according to claim 21, wherein the destination storage element is addressable by a single address so that the result sub-strings are not independently addressable from the destination storage element.

29. A computer comprising:

a processor including a plurality of execution units;

data storage circuitry including at least source and destination storage elements to hold a source data string and a result data string, respectively, the source data string including a first number of source sub-strings, the source storage element being addressable by a single address so that the source sub-strings are not independently addressable from the source storage element; and a memory that stores an instruction sequence including at least one combining instruction selected from a plurality of combining instructions, each combining instruction for combining a plurality of the source sub-strings within the source data string;

wherein the processor is programmed so that the at least one combining instruction causes at least one of the execution units to operate on at least two source sub-strings to generate at least one combined sub-string, the result data string including a second number of result sub-strings, at least one of the second number of sub-strings being identical to the at least one combined sub-string.

30. The computer according to claim 29, wherein the result data string is available for use by a subsequent instruction that is independent from the at least one combining instruction.

31. The computer according to claim 29, wherein the destination storage element is addressable by a single address so that the result sub-strings are not independently addressable from the destination storage element.

32. The computer according to claim 29, wherein each of the source sub-strings represents discrete data values.

33. The computer according to claim 29, wherein each of the source sub-strings has a selectable bit length.

34. The computer according to claim 33, wherein the at least one combining instruction specifies a bit length for the source sub-strings.

35. The computer according to claim 29, wherein the at least one combining instruction performs a polyadic operation of a type defined by the at least one combining instruction.

36. The computer according to claim 29, wherein the second number of result sub-strings is less than the first number of sub-strings.

\* \* \* \* \*